Patented Feb. 25, 1936

2,032,091

UNITED STATES PATENT OFFICE 2,032,091

PLASTICIZED COMPOSITION

Harold S. Holt, Wilmington, Del., assignor to E. I. du Pont de Nemours & Company, Wilmington, Del., a corporation of Delaware No Drawing. Application July 21, 1934, Serial No. 736,346. In Canada September 13, 1933

9 Claims. (Cl. 134—79)

This invention relates to plasticized compositions and the preparation of same and, more particularly, to cellulose derivative compositions containing, as a plasticizer therefor, polyhydric ether alcohol esters of saturated fatty acids containing from 3-5 carbon atoms, inclusive, and/or polyhydric alcohol esters containing at least three primary alcohol groups, of said acids. This application is a continuation in part of applicant's copending application Serial No. 609,041, filed May 3, 1932, entitled "Esters", directed to new esters, per se, and their preparation.

An object of the present invention is to provide new plasticized compositions containing, as plasticizers therein, esters which are highly compatible with the ordinary plastic materials used in the coating, film, and plastic arts, which esters have low vapor pressures and otherwise acceptable properties. A further object is to provide new plasticized cellulose derivative compositions. Other objects of the invention will be apparent from the description given hereinafter.

The above objects are accomplished according to the present invention by employing as a plasticizer in cellulose derivative and other compositions an ester of a saturated fatty acid containing from 3-5 carbon atoms, inclusive, and a polyhydric alcohol from the group consisting of polyhydric ether alcohols and polyhydric alcohols containing at least three primary alcohol groups. In a preferred form the invention comprises a cellulose derivative composition containing, as a plasticizer therefor, a polyhydric ether alcohol ester of a saturated fatty acid containing from 3-5 carbon atoms, inclusive.

The esters herein considered for use as plasticizers may be readily prepared by reacting the fatty acid in question with the polyhydric alcohol at a sufficiently high temperature to expel the water produced in the reaction as fast as it is formed, or by using a catalyst such as sulphuric acid, and/or a solvent such as toluene or ethylene dichloride to aid in the removal of water. The esters likewise may be prepared from the sodium salt, or other salts, of the fatty acid and the chloride of the polyhydric alcohol, or they may be prepared by an ester interchange.

The following examples are given to illustrate the preparation of these esters:

*Example 1.—Diethylene glycol dipropionate.—* A mixture of 106 grams diethylene glycol, 175 grams propionic acid, 100 grams toluol, and 1 cc. sulfuric acid was heated to boiling in an apparatus designed to separate the water from the distillate and return the toluol to the reaction flask. When the theoretical amount of water had been removed the product was washed with dilute sodium carbonate solution to remove excess acid and then vacuum distilled. The product boiled from 165-170° C. at 40 mm. pressure.

*Example 2.—Diethylene glycol di-isobutyrate.—* A mixture containing 318 g. diethylene glycol, 616 g. isobutyric acid, 375 g. ethylene dichloride, and 10 g. sulfuric acid was heated to boiling in the apparatus described in Example 1. The product was purified as in Example 1.

*Example 3.—Pentaerythritol propionate.—* A mixture containing 136 g. pentaerythritol, 350 g. propionic acid, 100 g. toluol, and 1 cc. sulfuric acid was heated to boiling in an apparatus as described in Example 1. After the theoretical amount of water had been removed the product was washed with sodium carbonate solution to remove excess acid, then heated in the presence of decolorizing carbon to 170° C. at 25 mm. pressure to remove the unreacted material. The resulting product was a light colored liquid.

*Example 4.—Tripropionate of trimethylol propane.—* A mixture containing 134 g. trimethylol propane, 250 g. propionic acid, 100 g. toluol, and 1 cc. sulfuric acid was treated as in Example 3. The refined product was a water-white liquid.

*Example 5.—Diethylene glycol butyrate.—* A mixture containing 424 g. diethylene glycol, 792 g. butyric acid, 500 g. ethylene dichloride, and 10 g. sulfuric acid was heated to boiling in the apparatus described in Example 1. The product was refined as described in Example 1.

It will be understood that the above examples are merely to illustrate the convenient preparation of these esters, the particular method of preparing the esters being irrelevant as far as the present invention is concerned. As coming within the scope of this invention are the esters of all the saturated aliphatic acids containing from 3-5 carbon atoms, inclusive, such as propionic, butyric, n-valeric, isovaleric, and other branched chain 5 carbon acids of this type. The alcohols include the polyhydric ether alcohols generally, among which may be mentioned other than those given in the specific examples, the mono or polyaryl or alkyl ethers of glycerol, pentaerythritol, sorbitol, and trimethylol propane; polyglycols generally such as triethylene glycol, dipropylene glycol, dibutylene glycol, and the like, and also polyglycerols generally. Polyhydric alcohols containing at least three primary alcohol groups are included as a class and include, other than those mentioned in the specific examples, trimethylol ethane and enneahepitol. Other polyhydric alcohols not falling within the two classes mentioned but coming within the scope of this invention are sorbitol, erythritol and xylitol.

It is to be understood that the esters herein used as plasticizers for coating and plastic compositions according to the present invention are of the type wherein the particular alcohol selected has each of its hydroxyl groups esterified by a saturated aliphatic acid containing from 3–5 carbon atoms, inclusive. Usually all of the hydroxyl groups will be esterified with the same aliphatic acid since the preparation of this type of ester is more readily carried out but different acids within the group specified may be employed to esterify the hydroxyl groups, if desired.

The esters herein included are all light colored or water white liquids of relatively high boiling points and low vapor pressures. A characteristic of this class of compounds is that they are compatible with cellulose derivatives and the widest assortment of natural and synthetic resins. Furthermore, they are readily soluble in the organic solvents customarily used in formulating coating and plastic compositions.

The following examples are given to illustrate typical coating compositions according to the present invention, parts being given by weight:—

*Example 6*

|   | Parts |
|---|---|
| Cellulose nitrate | 12 |
| Damar | 3 |
| Trivalerate of trimethylol-propane | 4 |
| Castor oil | 2.6 |
| Solvent | 166 |

*Example 7*

|   | Parts |
|---|---|
| Cellulose acetate | 12 |
| Diethylene glycol propionate | 6 |
| Solvent | 182 |

*Example 8*

|   | Parts |
|---|---|
| Ethyl cellulose | 12 |
| Triethylene glycol butyrate | 3 |
| Solvent | 120 |

*Example 9*

|   | Parts |
|---|---|
| Polymerized alpha methyl methacrylate | 12 |
| Pentaerythritol tetra-isobutyrate | 3 |
| Solvent | 120 |

*Example 10*

|   | Parts |
|---|---|
| Cellulose nitrate | 12 |
| Pigment | 16.3 |
| Damar | 3.5 |
| Monoethylin di-isovalerate | 4 |
| Solvent | 161 |

The above coating compositions give films which dry tack free in a few minutes and are extremely tough and flexible. By the term "solvent" as used in the examples is meant any suitable mixture of esters, alcohols, ketones, and/or hydrocarbons, such as would be obvious to one skilled in the lacquer art. These examples are merely illustrative and it will be understood that other resins than damar, for example, ester gum, and other synthetic and natural resins, may be used in the above compositions, and that the plasticizers may be replaced in part by one or more of the common plasticizers such as triacetin, dimethyl phthalate, triphenyl phosphate, camphor, dibutyl phthalate, and the like.

The following examples are given to illustrate typical plastic compositions according to the present invention, parts being given by weight:

*Example 11*

|   | Parts |
|---|---|
| Cellulose acetate | 100 |
| Diethylene glycol dipropionate | 60 |

*Example 12*

|   | Parts |
|---|---|
| Cellulose nitrate | 100 |
| Tributyrate of trimethylolpropane | 50 |
| Pigment (including filler) | 200 |

*Example 13*

|   | Parts |
|---|---|
| Ethyl cellulose | 100 |
| Pentaerythritol tetravalerate | 15 |

*Example 14*

|   | Parts |
|---|---|
| Polymerized alpha methyl methacrylate | 100 |
| Triethylene glycol diisobutyrate | 15 |

*Example 15*

|   | Parts |
|---|---|
| Formaldehyde modified vinyl acetate resin | 100 |
| Monoethylin dibutyrate | 20 |

*Example 16*

|   | Parts |
|---|---|
| Cellulose acetate | 100 |
| Diethylene glycol diisobutyrate | 80 |

The above plastic compositions may be prepared with or without the usual volatile solvents such as alcohol, acetone, toluol-alcohol mixtures, and the like, as will be obvious to those skilled in the art. The examples are merely illustrative and may be widely varied; the plasticizers may be replaced in part by one or more of the common plasticizers such as heretofore mentioned.

The following examples are given to illustrate plastic compositions, wherein the plasticizers of the present invention are partially replaced by heretofore known plasticizers to give particularly favorable properties, parts being given by weight:—

*Example 17*

|   | Parts |
|---|---|
| Cellulose acetate | 100 |
| Diethylene glycol diisobutyrate | 51 |
| Dimethyl phthalate | 35 |

*Example 18*

|   | Parts |
|---|---|
| Cellulose acetate | 100 |
| Triphenyl phosphate | 20 |
| Diethylene glycol isobutyrate | 20 |

*Example 19*

|   | Parts |
|---|---|
| Cellulose acetate | 100 |
| Triphenyl phosphate | 15 |
| Diethylene glycol isobutyrate | 15 |
| Dimethoxyethyl phthalate | 10 |

Example 16, having a relatively high proportion of plasticizer, is particularly well adapted for forming interlayers for laminated glass, that is, so-called safety or shatterproof glass. Example 17 also illustrates a composition having a relatively high total plasticizer content and is also well suited for forming interlayers for laminated glass. Interlayers having a relatively high plasticizer content, such as in the neighborhood of 80 parts total plasticizer content to 100 parts of the organic plastic substance employed, may be used by bonding with one or more glass sheets under heat and pressure without adhesives, although adhesives are ordinarily used with such interlayers according to the present practice. Example 17 is merely illustrative of the combination of two or more plasticizers in compositions suited for use as interlayers. As will be understood by those skilled in this art, the relative proportion of each plasticizer may be widely varied and the total plasticizer content likewise may be varied greatly. Not only is dimethyl phthalate useful for this purpose but also the dialkyl phthalates in general, among which phthalates may be mentioned diethyl phthalate, dipropyl phthalate, dibutyl phthalate, diamyl phthalate, diisobutyl phthalate and diisoamyl phthalate. These phthalates are all relatively non-volatile and may be used to advantage to increase the plasticizing action of the new plasticizers herein disclosed.

Examples 18 and 19 are illustrative of specific compositions for general use and not especially adapted for use as interlayers in safety glass. In these compositions not only triphenyl phosphate but the triaryl phosphates in general are useful and among these phosphates may be mentioned tri-o-cresyl phosphate, tri-p-cresyl phosphate, and mixtures of tricresyl phosphates. The total plasticizer content can be varied widely, such proportions ranging from 5–150%, or more, by weight of the cellulose derivative or other organic plastic substance employed, depending upon the particular use to which the composition is to be put.

The class of esters coming within the scope of the present invention may not only be employed to plasticize the cellulose derivatives and resins set forth in the specific examples above but also for a wide variety of other cellulose derivatives and resins such as cellulose propionate, cellulose butyrate, cellulose acetobutyrate, cellulose isobutyrate, cellulose nitroacetate, cellulose crotonate, benzyl cellulose, dodecyl cellulose, butyl cellulose, crotyl cellulose, etc., polybasic acid-polyhydric alcohol resins, phenol-formaldehyde resins, natural resins such as kauri, shellac, pontianac, and elemi, and various other natural and synthetic resins commonly used in the manufacture of plastic and coating compositions.

It is to be noted that most of the above substances are organic plastic substances containing a plurality of C—O—C linkages, either in the form of ester linkages or ether linkages. While the invention is not to be limited by the theory or explanation here given, it is of interest that the esters of the present invention which are useful as plasticizers contain a plurality of C—O—C linkages themselves, and it may be due to this fact that they are useful as plasticizers for the organic plastic substances containing a plurality of such linkages.

The compositions herein disclosed may be used as lacquers for coating metal and wood and dopes for coating fabrics, in moisture-proof lacquers for coating regenerated cellulose sheets and in plastic compositions to be used in the preparation of toilet ware, novelties, sheeting, rods, tubes, safety glass interlayers, and the like.

An advantage of the present invention is that it provides compositions containing plasticizers characterized by extremely low vapor pressures and water insolubility, giving compositions which are more permanently flexible and water resistant. Many of these plasticizers are of the type of triacetin but are materially better than triacetin plasticizers in being less volatile and more water resistant.

As many apparently widely different embodiments of this invention may be made without departing from the spirit and scope thereof, it is to be understood that the invention is not limited to the specific embodiments thereof except as defined in the appended claims.

I claim:
1. A composition comprising a cellulose derivative and, as a plasticizer therefor, an ester of diethylene glycol wherein both of the hydroxyl groups are esterified by a saturated fatty acid from the group consisting of propionic and butyric acids.
2. A composition comprising a cellulose derivative and, as a plasticizer therefor, diethylene glycol dipropionate.
3. A composition comprising a cellulose derivative and, as a plasticizer therefor, diethylene glycol di-isobutyrate.
4. A composition comprising a cellulose derivative and, as a plasticizer therefor, an ester of diethylene glycol wherein both of the hydroxyl groups are esterified by a saturated fatty acid from the group consisting of propionic and butyric acids, and a dialkyl phthalate.
5. A composition comprising cellulose acetate and, as a plasticizer therefor, an ester of diethylene glycol wherein both of the hydroxyl groups are esterified by a saturated fatty acid from the group consisting of propionic and butyric acids, and a dialkyl phthalate.
6. A composition comprising cellulose acetate and, as a plasticizer therefor, diethylene glycol di-isobutyrate.
7. A composition comprising cellulose acetate and, as a plasticizer therefor, diethylene glycol di-isobutyrate and dimethyl phthalate.
8. A composition comprising a cellulose derivative and, as a plasticizer therefor, an ester of diethylene glycol wherein both of the hydroxyl groups are esterified by a butyric acid.
9. A composition comprising cellulose acetate and, as a plasticizer therefor, an ester of diethylene glycol wherein both of the hydroxyl groups are esterified by a butyric acid.

HAROLD S. HOLT.

DISCLAIMER 2,032,091.—*Harold S. Holt*, Wilmington, Del. PLASTICIZED COMPOSITION. Patent dated February 25, 1936. Disclaimer filed November 18, 1937, by the assignee, *E. I. du Pont de Nemours and Company*.

Hereby enters this disclaimer to claims 1 and 2 of said specification.

[*Official Gazette December 7, 1937.*]